(12) United States Patent  
Linhart

(10) Patent No.: US 9,363,984 B2  
(45) Date of Patent: Jun. 14, 2016

(54) METHOD OF A THERMAL TREATMENT OF BEE COLONIES AND A DEVICE FOR PURSUANCE OF THIS METHOD

(71) Applicant: Roman Linhart, Hermanuv Mestec (CZ)

(72) Inventor: Roman Linhart, Hermanuv Mestec (CZ)

( * ) Notice: Subject to any disclaimer, the term of this patent is extended or adjusted under 35 U.S.C. 154(b) by 226 days.

(21) Appl. No.: 14/077,046

(22) Filed: Nov. 11, 2013

(65) Prior Publication Data

US 2014/0134920 A1 May 15, 2014

(30) Foreign Application Priority Data

Nov. 12, 2012 (CZ) .................................. 2012-775

(51) Int. Cl.
*A01K 47/06* (2006.01)
*A01K 51/00* (2006.01)

(52) U.S. Cl.
CPC ................ *A01K 51/00* (2013.01); *A01K 47/06* (2013.01)

(58) Field of Classification Search
CPC ........ A01K 47/00; A01K 47/06; A01K 51/00
USPC ......................................... 449/2, 3, 6, 12, 15
See application file for complete search history.

(56) References Cited

U.S. PATENT DOCUMENTS

| 182,733 | A | * | 9/1876 | Worrall ................... | A01K 47/06 449/31 |
| 2,599,141 | A | * | 6/1952 | Taylor ..................... | A01K 47/06 126/908 |
| 4,257,133 | A | * | 3/1981 | Steinrucken ........... | A01K 47/06 449/12 |
| 4,300,250 | A | * | 11/1981 | Taylor ..................... | A01K 47/06 449/12 |
| 4,443,904 | A | * | 4/1984 | van Muyden .......... | A01K 53/00 449/10 |
| 4,494,528 | A | * | 1/1985 | Horton .................... | A01K 47/06 126/627 |
| 5,158,497 | A | * | 10/1992 | Rossignol .............. | A01K 49/00 119/6.5 |
| 2012/0202403 | A1 | * | 8/2012 | Sinanis .................. | A01K 51/00 449/2 |

* cited by examiner

*Primary Examiner* — Kathleen Alker
(74) *Attorney, Agent, or Firm* — Bryant J. Keller; Kirton McConkie, PC

(57) ABSTRACT

A thermal treatment of bee colonies to ensure death of bee parasites in an interior of a hive frame superstructure through transformation of short wave electromagnetic radiation to long wave thermal radiation, where an efficient temperature increase above the value of 40° C. is done by the help of a secondary thermal energy and/or a primary thermal energy when sunrays or a generated radiation permeate through a thermosolar lid on an active surface of a photo-absorbent component and/or go through a transparent screen into the interior of the hive frame superstructure and land on an active photo-absorbent layer of a thermo solar frame. Also described is construction of a device for pursuance of a thermal treatment of bee colonies. Other implementations are also described.

16 Claims, 3 Drawing Sheets

Figure 1:
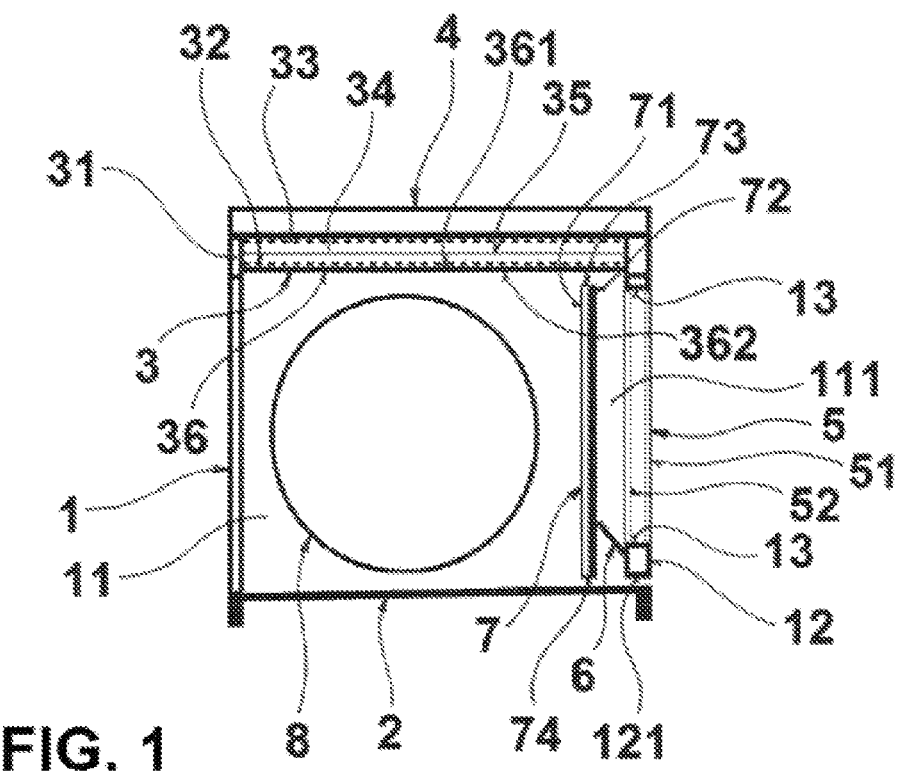

METHOD OF A THERMAL TREATMENT OF BEE COLONIES AND A DEVICE FOR PURSUANCE OF THIS METHOD

CROSS-REFERENCE TO RELATED APPLICATION

This application claims the benefit of Czech Republic Patent Application No. CZ2012-775, entitled THE METHOD OF A THERMAL TREATMENT OF BEE COLONIES AND A DEVICE FOR PURSUANCE OF THIS METHOD, filed Nov. 12, 2012, which application is incorporated in its entirety by reference.

FIELD OF THE INVENTION

The invention is within the area of beekeeping, thus especially keeping of an Apis family and regards to the method of a thermal treatment of a bee colony in a bee hive, when is, by the help of device for a thermal regime control in the bee hive, positively influenced wellbeing of bee colony in its interior. Thereby is enabled an early spring development of bee colony and a decrease of undesired kinds of organisms as is mite *Varroa destructor.*

BACKGROUND OF THE INVENTION

The bee *Apis mellifica*, otherwise known as the honey bee, is being damaged by a highly invasive parasite *Varroa destructor*. It is a parasitic mite which comes from the Asia region. The Asia-local east bee *Apis cerana* is, due to long term co-evolution with this mite, genetically equipped with a regulation mechanism, by the help of which it decreases mite population in the colony on the level which will not cause the colony to perish. In contrast, the honey bee does not have any natural striking power against this new coming mite. At present, the mite *Varroa* presents a significant and difficult to solve problem for rearing of honey bees. Varroatosis (the disease caused by *Varroa destructor*) endangers colonies worldwide, although it has not spread in Australia yet. Varroatosis is therefore considered as a globally spread and the most severe disease of bee brood and adult bees.

All development stages of *Varroa* prey on haemolymph, thus on blood of bees and brood. They do not only deplete the body of the hosts of nutrients but also cause losses of haemolymph through numerous injuries of the skin. *Varroa* moreover also transmits causative organisms of many serious viral infections of the bees, and without a treatment from human side causes death of invaded colonies in two to three years from their colonization. Weakening of the colonies causes winter colony loss and enables more malign course of many other bee diseases.

The development cycle of *Varroa destructor* takes place in the honey bee on a sealed brood of worker bees and drones. Just before the sealing, a fertilized female *Varroa* passes from adult bees to bee brood. After the sealing, she lays on an erect larva and prepupa most often 2-5 eggs. From the egg emerges hexapod larva, next stages are protonymph and deuteronymph. Sexually mature *Varroa* males develop in seven days and sexually mature females develop in 9 days. While the bees and parasites are still in the cell, male parasites perish after mating and fertilized females take hold of the young bee, finishing the development. Together with the bee, the female *Varroa* leave the cell. On worker bees or drones they live several days (2-60), before they are sated, move back to cells, and start to lay eggs. For drone bees, it is characteristic for them to drift into other hives and thus they become main transmitters of this parasite. Similarly, worker bees transmit attached mites into surrounding colonies during drifting or robbery.

There are several different methods and procedures currently used for reduction of the quantity of *Varroa* mite population in bee colonies. The first of them is a method of chemical treatment with substances of an artificial origin. Thus these are substances which are not naturally in nature and are produced by chemical industry. These are, for example, fumigation or contact acaricides. A disadvantage of this treatment, by these substances, is the fact that they may accumulate to human toxic levels in bee products such as in honey and wax. The market value of these commodities is decreased in comparison with the same products from ecological production without toxic substances. Additionally, the mites have already developed an undesired resistance to some remedies.

The second method of treatment of Varroatosis is based on an application of so called "natural chemistry". This means a treatment with chemical substances, which are ordinarily common in nature. These are, for example, substances which contain formic acid, essential oils, lactic acid, alcohol or traps with aromatic substances, so called pheromone traps. A disadvantage of use of these substances is possible residua, thus remains of more or less poisonous matters that decompose with difficulty. Another disadvantage of this treatment is the fact that the preparations based on organic acids may harm development of the brood and shorten length of life of adult bees. When they are applied, there are problems with their low or short time efficiency. These substances moreover do not, in sufficient amount, affect development stages of mite, covered under wax caps of the cells. Thus, it is very common supplement treatment with application of synthetic matters in form of fumigation, aerosol treatment, insertion of acaricide strips with long term efficiency, spring painting of the brood and so on. These methods of chemical treatment compensate for insufficient efficiency of the substances based on natural chemistry.

The next method of decreasing the amount of mites is biotechnical methods when chemical substances are not used at all. As an example of this biotechnical procedure, it is possible to mention a method of drone brood comb use as an allurement for mite females. This method, however, can be purposeful only at certain periods of the year, generally from April till July when the drone comb is present. Problems with this method include a relatively high work demand factor and a necessity of accurate keeping of terms of cut out and removal of parasitized drone brood. Moreover, according to some studies, cut out of the drone brood decreases honey yield up to 30% and likewise supports swarming of bees.

Biophysical mechanisms are also used for reduction or liquidation of mites in colony. Part of this category is also a method of thermal treatment of colonies. It is matter of common knowledge that even a relatively small increase of the temperature above normal brood temperature, which ranges in interval from 33-36° C., harms mites or even causes their death. Also Indian bees, as an original host species of *Varroa* mite, purposely warms its worker brood more than its drone brood. Thus, in this Asian species, the mites attach only to development stages of drones. Because they do not parasitize on worker bees they do not disturb viability of society as whole.

The method of thermal treatment of colonies against *Varroa destructor* has not been yet, even around the world, developed to the point to be usable to the larger extent in ordinary bee operations. The thermal treatment of the colonies is, by part of professional public, perceived and classified as an alternative method of treatment, which is completely inefficient or in practice unusable for whole colonies.

In publication Varroatosis (Dr. Friedrich Pohl, Víkend publisher 2008, pg. 55) is mentioned a method of thermal treatment of combs without bees. In research, not in operational, conditions the brood combs are deprived of bees and in a warm up case are heated for a certain time for mites to die but for the bee brood not to be damaged. This technology is suitable only for scientific experiments, since thermal differences are very low and consequences for bees are to be yet explored.

From a thermal effect application on whole colonies point of view it is possible to distinguish two techniques. The first technique is based on several hours' lasting heating of hive environment to lower temperature of 40-42° C., which is demanding on time and technical equipment. The bees are for the whole period of mite extermination closed in the hive and its entrance is closed, or dramatically narrowed. During a several hours of lasting heating it is necessary to ensure oxygen for imprisoned bees in the method not to cool down the hive. Likewise it is necessary to divert produced carbon dioxide without thermal losses. It is necessary to regulate temperature not to exceed dangerous limit and kill the imprisoned bees. Adult bees, that is to say, are only able to endure lower temperatures than treated brood. This requires installment of accurate regulation mechanisms controlled by thermostats. The beekeeper has to be present and check or control activities of all mechanisms supporting the life of closed colonies. To allow hot air to spread from a heat source along all spaces of the hive, it is sometimes necessary to increase a gap between combs and apply a system of hot air forced circulation in the hive, for example by the help of a ventilator. This requires not only further technical devices but also a necessity of colonies' dismounting. Therefore any method, based on particular colonies dismount and longtime heating of each hive by the source of an artificial heat, is expensive, technically demanding and to a large extent, nonutilizable.

A second technique of a research application of thermal treatment is based on very strong but short lasting heating of the hive interior up to more than 50° C., for period of several minutes. A longer time interval of this strong heating would kill the bees. A disadvantage of this technique is a fact that a thermal effect will not strike mites on brood, because in a few minutes does not come to necessary heating of the core of the combs. The development stages of the mite survive, and only mites which are on bees in the given moment of treatment are killed. Approximately 80% of all mites in the colony are hidden on the brood, however, under protection of a wax cap. Therefore this method is not and cannot be sufficiently efficient in practice as it does not liquidate a majority of parasites. This method is also risky. If the colony is exposed to high temperature several minutes longer than it is optimal it may cause the bee larvae to fall out from the cells of the combs, it may disturb bee brood development or may even cause older bees to perish. The result may be worse consequences for the colony than damage caused by the mite itself.

Different devices for a thermal treatment of bees against Varroatosis are known. For instance in file CZ 235489 is described a solution where a heat exchanger is placed on the bottom of the box and in an upper part are situated controllable openings for hot air off take from the box. Further is known a solution mentioned in file WO2012108857 A1, where in an interior of a hive above a brood area is placed a ridge body connected via a cable to a source of electric current, which in combination with a heat radiator, electronic control unit, thermal sensor, and an optional diagnostic system enables reduction and control of Varroatosis in colonies.

GR1005196 B2 introduces a method and a device designed for a thermal treatment of a colony. In this disclosed method, a bee population in a hive is for a period of 12 minutes exposed to temperature of 40° centigrade. A turbine and a pipeline to a bottom of the hive are used to form a hot air flow closed circuit in the hive.

The problem of the majority of so far published solutions is in a limited possibility of their practical use. A thermal treatment is usually not applied on a whole colony, but many devices are based on a bee thermal treatment without combs, combs without bees and so on, which is very labored and in principle nonutilizable in a commercial practice where the beekeeper has to take care of hundreds or thousands of colonies. To reach an effect of thermal killing of mites there are used structurally complicated and thus also expensive devices, dependent on external sources of electric energy. These have movable and therefore faulty parts which wear out when used. This alone complicates their use in a beekeeping profession.

Likewise are known technical designs and techniques which are applicable for whole colonies. For example in magazine "Včelařství" 7/2012, page 231 is described a device for mite liquidation which works on the presumption that the mite dies at 40° C. temperature, but the bee survives for short periods at 50 to 55° C. temperature. A disadvantage of this solution is an excess of labor and a low efficiency, also the fact that a whole colony is inserted into thenno boxes equipped with thermostats treated with a same regulated temperature, whereas adult bees are only able to endure far lower temperatures than young bees, larvae and pupae. If we imprison an entire colony in a hive and heat the hive intensively there is a risk of killing old bees. There is also risk of a suffocation of a whole colony if there is not, by a technically difficult way, ensured an oxygen entry and carbon dioxide take off and this all without thermal losses which would decrease heating efficiency. Devices which would be able to treat whole colonies in a safe way via an accurately regulated temperature and without bees' mortality are therefore very expensive.

The colonies themselves have to, in a brood rearing period, keep temperature of at least 33° C., namely at the expense of metabolic burning of glycide reserves, thus honey and sugar. The temperature has a completely essential importance for a spring development of colonies. It is, for example, known that in urban areas the colonies have a faster development than the colonies in an open countryside by several weeks. This is due to fact that an urban climate is of mere 2-3° C. warmer than in an open countryside. Commonly used hives are not equipped with a device which would generate a thermal energy and thereby simplify and hasten development of colonies in springtime. They also do not have a device which would supply important water in early spring. Therefore, artificially warmed bees fly out from a hive and chill by watering places. A combination of these unfavorable facts decreases honey yield form early flowering cultures and also decreases flying activity and a pollination performance of colonies.

From U.S. Pat. No. 4,494,528 A is known a method of a thermal treatment of colonies which uses a solar energy. A movable solar collector is possible to set in two positions, when in first position the solar collector is placed above the hive and in second position it is inclined in a sunward direction. In this position the hive is heated via solar energy. The cold air is sucked from an interior of the hive into a piping system, is heated by the help of a collector and then it is returned hack to the hive. A disadvantage of this solution is the solar panel must be manipulated at the start and finish of solar heating, which is labor and time demanding.

The aim of a featured invention is to introduce a new method of a thermal treatment of colonies which efficiently decreases *Varroa destructor* populations' multitude without chemical treatment. The second positive effect is an improvement of thermal wellbeing of colonies and their better development in a spring period. By the help of this invention is significantly reduced an occurrence of parasites *Varroa* in all development stages, yet it does not achieve 100% efficiency after first treatment. The full extermination of the parasite is reached after repeated use of thermal treatment in a given year. Because the whole colony is not treated at the same time in one step it is not necessary to imprison adult bees, which are high temperature sensitive, in the hive. There is therefore no risk of their killing by a heat during treatment. Therefore there is no necessity of an expensive thermoregulation mechanisms' application. Individual adult bees' age-related heat tolerance is respected by allowing for a possibility of a spontaneous departure of adult bees from the area with, for them, dangerous temperature. Bee brood, which is a highly resistant to temperature, survives thermal treatment without consequences. However the brood is completely free of parasitic mites which reproduce on it. The lifecycle of this device for a thermal treatment is at least as long as a lifecycle of the hive, thus several decades.

BRIEF SUMMARY OF THE INVENTION

The set goal is to a large extent met with an invention which is a method of a thermal treatment of bee colonies in order to ensure death of bee parasites in an interior of a hive frame superstructure by the help of a transformation of short wave electromagnetic radiation for long wave thermal radiation. The essence of the invention is in the fact that an efficient temperature increase to over 40° C. is achieved by the help of a secondary thermal energy and/or primary thermal energy, when sunrays or generated radiation permeate a thermosolar lid on an active surface of a photo-absorbent component and/or go through a transparent screen into an interior of the hive frame superstructure where they land on an active photo-absorbent layer of a thermo solar frame.

It is advantageous when the primary thermal energy flows in the interior of the hive frame superstructure at first upwardly along the thermo solar frame up to level of a hive frame superstructure ceiling or to the level of the ceiling thermosolar lid or a hive cover and then forwards in a horizontal direction further into the hive frame superstructure where it heats brood nest.

It is advantageous when the thermo solar frame reflects, by the help of a thermo insulation layer, the metabolic heat, which is radiated from the brood nest, back into the interior of the hive frame superstructure.

It is also advantageous when a secondary thermal energy is by the help of a radiant surface of a photo-absorbent component radiated into the interior of the hive frame superstructure, where it heats the brood nest and when the secondary thermal energy releasing from the active surface of the photo-absorbent component upward is directed from an external frame part and/or a thermo-insulating foil back toward the photo-absorbent component whereby a greenhouse effect is formed in the thermosolar lid.

It is also advantageous when the primary thermal energy and the secondary thermal energy efficiently cooperate and create a temperature increase in an entire interior of the hive frame superstructure and heat the brood nest.

Further the essence of the invention is the device for pursuance of a thermal treatment of bee colonies in order to ensure death of bee parasites in the interior of the hive frame superstructure via a transformation of short wave electromagnetic radiation for long wave thermal radiation. The hive frame superstructure is equipped, for production of primary thermal energy or secondary thermal energy or for simultaneous production of the primary thermal energy and the secondary thermal energy, either with a thermosolar lid, provided with a photo-absorbent component, which contains an active surface and a radiant surface, or is on the side provided with a transparent screen, whereas in an interior of the hive frame superstructure is placed a thermo solar frame, which is provided, by an active photo-absorbent layer situated in a direction toward [a] the screen, or the hive frame superstructure is simultaneously equipped partly with a thermosolar lid provided with a photo-absorbent component which contains an active surface and a radiant surface and partly with the side transparent screen, whereas in an interior of the hive frame superstructure is placed a thermo solar frame, which is provided, with an active photo-absorbent layer situated in direction toward the screen.

In an advantageous design of the device the screen is formed by a transparent external component and/or an internal component, whereas on a transparent internal component of the screen is fixed a drip trough for a capture of condensed liquid.

In an optimal case the thermo solar frame is in an interior of the hive frame superstructure and made concurrently with its face board to form between the thermo solar frame and an internal component of the screen a front chamber of upward flow of hot air and simultaneously there is a free space above a top frame end and a bottom frame end of the thermo solar frame.

In an optimal design the thermosolar lid consists of a frame built into the hive frame superstructure from the side and/or in the form of a ceiling and contains a transparent internal frame part adjacent to a photo-absorbent component and/or a transparent external frame part, whereas between the external frame part and the photo-absorbent component is formed a closed space.

It is also advantageous when in the closed space of a thermosolar lid is placed a transparent thermo-insulating foil for an increase of a greenhouse effect.

By the featured invention it is possible to reach a higher efficiency in that by the presented method of thermal treatment of bee colonies and by the presented device for a thermal regime control in the hive an efficient reduction of parasites is achieved, whereas it is used such a method of a thermal treatment of bee colonies which respects different sensitivity of bees for temperature regarding to their age and takes advantage of a possibility of a solar energy or another radiation source use. The bee colony treatment itself is not time demanding, production and operation costs are very low and the device is possible to use on already existing hive systems.

The method of a thermal treatment of bee colonies in order to ensure death of bee parasites (20) in an interior (11) of a hive frame superstructure (1) through transformation of short wave electromagnetic radiation for long wave thermal radiation, where the essence of the invention is in the fact that an efficient temperature increase above the value of 40° C. is achieved by the help of a secondary thermal energy (93) and/or a primary thermal energy (91) when sunrays (10) or a generated radiation (60) permeate through a thermosolar lid (3) onto an active surface (361) of a photo-absorbent component (36) and/or go through a transparent screen (5) into the interior (11) of the hive frame superstructure (1) where they land on an active photo-absorbent layer (72) of a thermo solar frame (7). Also is an essence of the invention a construction of a device for pursuance of a thermal treatment of bee colonies where the hive frame superstructure (1) is for formation of the primary thermal energy (91) or the secondary thermal energy (93) or for simultaneous formation of the primary thermal energy (91) and also the secondary thermal energy (93) either equipped with the thermosolar lid (3) provided with the photo-absorbent component (36) which contains an active surface (361) and a radiant surface (362) or is from the side provided with the transparent screen (5), whereas in the interior (11) of the hive frame superstructure (1) is placed the thermo solar frame (7) which is provided with the active photo-absorbent layer (72) situated in a direction toward the screen (5) or where the hive frame superstructure (1) is at the same time equipped partly with the thermosolar lid (3) provided with the photo-absorbent component (36) which contains the active surface (361) and the radiant surface (362) and partly with the transparent screen (5) on the side, whereas in the interior (11) of the hive frame superstructure (1) is placed the thermo solar frame (7) which is provided with the active photo-absorbent layer (72) situated in a direction toward the screen (5).

BRIEF DESCRIPTION OF THE SEVERAL DRAWINGS

Figure 2:
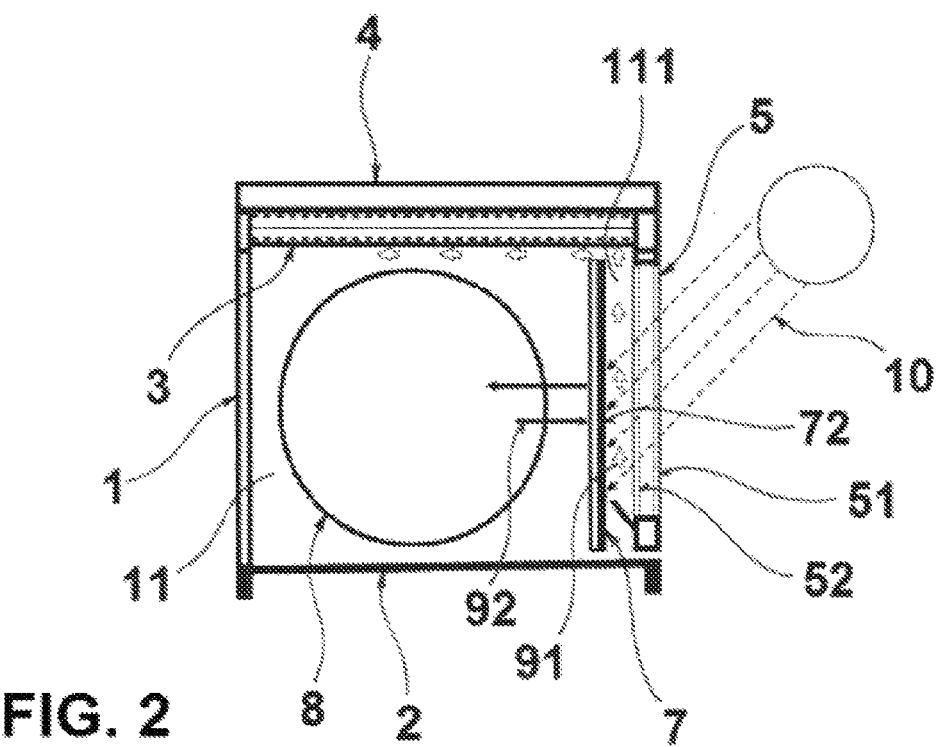
Figure 3:
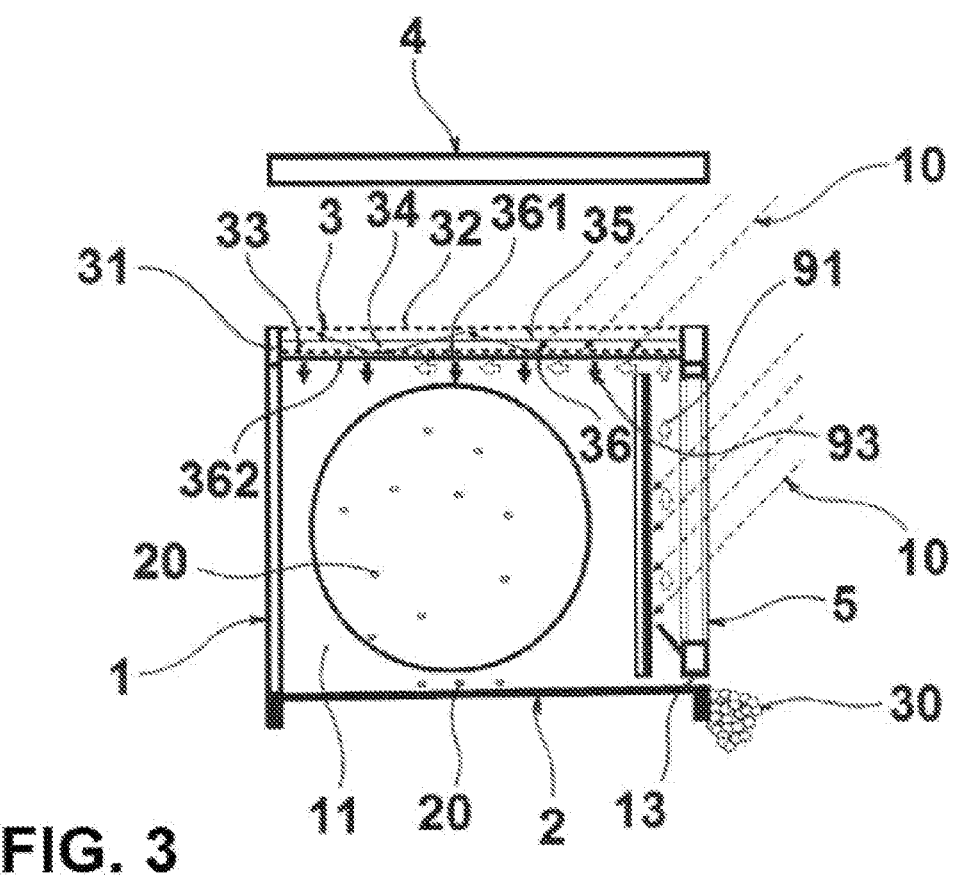
Figure 4:
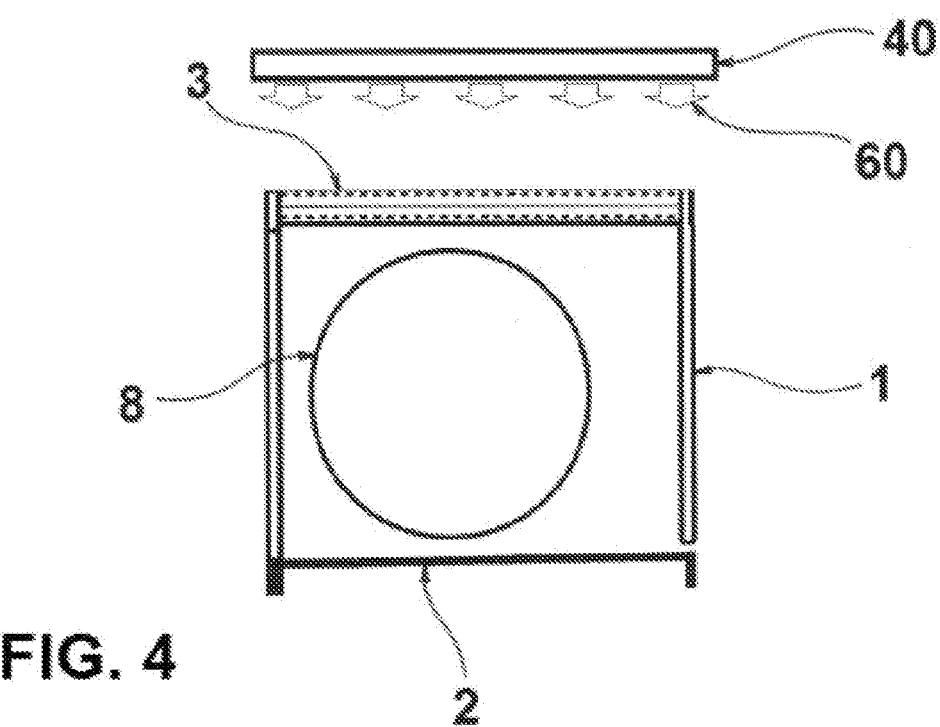
Figure 5:
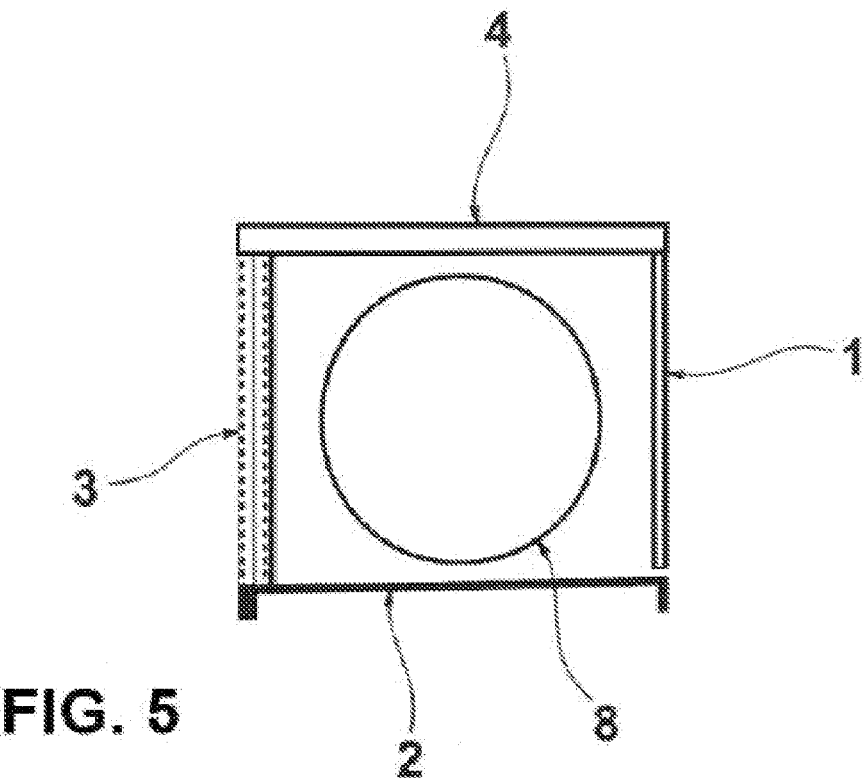
Figure 6:
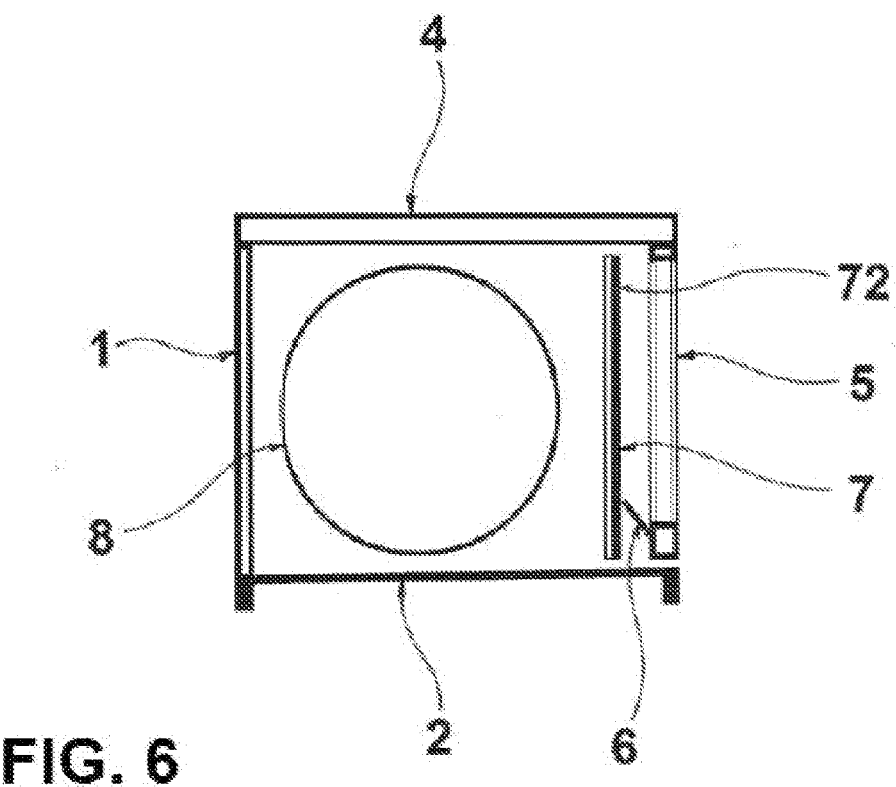

Particular examples of invention design are schematically illustrated in the enclosed drawings where:

FIG. 1 is a schematic side section of a device for a thermal treatment of bee colonies, FIG. 2 is a scheme of thermal treatment of a bee colony in a spring development regime, FIG. 3 is a scheme of a thermal treatment of a bee colony against Varroatosis in a summer regime, FIG. 4 is a schematic side section of a hive with a thermal treatment of a bee colony by the help of an outer thermo-energy component, FIG. 5 and FIG. 6 are schematic side sections of a device in alternative designs.

The drawings which illustrate the featured invention and subsequently described examples of a particular design do not in any case limit extend of protection given in the definition but only clarify the essence of the invention.

DETAILED DESCRIPTION OF THE INVENTION

The device for pursuance of a thermal treatment of bee colonies illustrated in FIG. 1 is formed by a hive frame superstructure 1 set on a hive bottom 2, whereas an upper part of the hive frame superstructure 1 adjoins a thermosolar lid 3 realized in the form of a ceiling above which is placed a removable hive cover 4. The hive frame superstructure 1 is from the side of a face board 12 provided partly with an entrance 121 situated by the hive bottom 2 and partly with a sideways-situated insulating gap 13, in which is set a screen 5. The screen 5 is formed by a transparent external and internal screen component 51, 52 realized for example by glass panels, whereas on the transparent internal screen component 52 of the screen 5 is in its lower part fixed a drip trough 6. In an interior 11 of the hive frame superstructure 1 is a brood nest 8, between it and a face board 12 of the hive frame superstructure 1 is placed a thermo solar frame 7 consisting of an inner thermo insulation layer 71 oriented in direction toward the brood nest 8 and an outer active photo-absorbent layer 72 oriented in direction toward the screen 5. The thermo solar frame 7 is in the interior 11 of the hive frame superstructure 1 placed concurrently with its face board 12 in a way such that between the thermo solar frame 7 and the internal screen component 52 of the screen 5 is formed a front chamber 111 of upward hot air flow and at the same time there is a free space above a top frame end 73 and a bottom frame end 74 of the thermo solar frame 7. The thermosolar lid 3 is formed by a frame 31 shaped in the way to fit on an upper part of the hive frame superstructure 1. In the frame 31 are placed, for example glued, transparent internal and external frame parts 32, 33 which are realized by perfectly transparent glasses or system of glasses. Between the internal frame part 32 and external frame part 33 is formed a closed space 34, in which is, for an increase of a greenhouse effect, placed a transparent thermo-insulating foil 35. Under the internal frame part 32 is placed a photo-absorbent component 36, realized for example in the form of a metal sheet, which is partly equipped with an active surface 361 absorbing short wave electromagnetic radiation and partly with a radiant surface 362 radiating long wave thermal radiation.

In FIG. 2 is illustrated a course of a solar method of a thermal treatment of bee colonies in spring regime. Short wave electromagnetic radiation in the form of sunrays 10 which go through transparent external and internal screen components 51, 52 of the screen 5 and land on the photo-absorbent layer 72 of thermo solar frame 7, whereby a transformation of short wave light radiation into long wave thermal radiation occurs. A primary thermal energy 91 which rises on the active photo-absorbent layer 72 of the thermo solar frame 7 flows in the interior 11 of the hive frame superstructure 1 at first upward through the front chamber 111 along the thermo solar frame 7 up to the level of the ceiling of the hive frame superstructure 1 realized in the form of a thermosolar lid 3. Afterward the primary thermal energy 91 proceeds under the thermosolar lid 3 in a horizontal direction further into the hive frame superstructure 1 above the brood nest 8, which is that way heated. A metabolic heat 92 emitted by the brood nest 8 is via the thermo insulation layer 71 of the thermo solar frame 7 kept in the interior 11 of the hive frame superstructure 1. At a temperature decrease, especially in night time the transparent internal screen component 52 of the screen 5 cools down and an atmospheric humidity condensation in the form of liquid drops occurs on the screen 5. The liquid spontaneously runs down thanks to gravitation into a drip trough 6 where it is accumulated. This liquid serves as a morning water place thus the bees do not have to fly out of the hive to get the water in the morning.

In FIG. 3 is illustrated a course of a solar method of a thermal treatment of bee colonies against Varroatosis in a summer regime. In a basic configuration there is placed a thermally insulating removable hive cover 4 above a ceiling thermosolar lid 3 and thus the sun radiation activity from above is blocked. After removal of the hive cover 4 from the thermosolar lid 3, sunrays 10 in the thermosolar lid 3 go through a transparent external frame part 33, a translucent thermo insulating foil 35 and a transparent internal frame part 32 and land on a photo-absorbent component 36, on an active surface 361, and through transformation of short wave electromagnetic radiation from sunrays 10, a secondary thermal energy 93 arises. In a closed space 34 a greenhouse effect is also formed by the help of the transparent internal frame part 32, the transparent external frame part 33 and the translucent thermo-insulating foil 35, when the secondary thermal energy 93 which releases from the active surface 361 of a photo-absorbent component 36 in an upward direction is directed from the external frame part 33 back in a direction toward the photo-absorbent component 36. The secondary thermal energy 93 which is accumulated in the thermosolar lid 3 is radiated into the interior 11 of the hive frame superstructure 1 through a radiant surface 362 of the photo-absorbent component 36. The temperature in the interior 11 of the hive frame superstructure 1 is further influenced through the primary thermal energy 91, which rises in the form of a flow of warm air on an active photo-absorbent layer 72 of the thermo solar frame 7. This results in an active cooperation of both thermal energies 91, 93 and to a temperature increase in the entire interior 11 of the hive frame superstructure 1 to a value higher than 40° C. Due to the increasing temperature, the brood nest 8, inside which are living parasites 20, is heated. Parasites are killed by this increased temperature and gradually fall on the hive bottom 2. Adult bees 30, for which increased temperature can be dangerous, escape to lower parts of the interior 11 of the hive frame superstructure 1 or gather by the entrance 121 of the hive frame superstructure 1 or stay in front of it. The thermal treatment is finished with an insertion of a the hive cover 4 on the thermosolar lid 3. The bees 30 then return to the brood nest 8 after a spontaneous decrease of the temperature a normal order of the hive is reestablished as before the thermal treatment.

The thermal treatment of bee colonies in an inner environment of the hive is realized either by the help of the primary thermal energy 91 which rises on the active photo-absorbent layer 72 of the thermo solar frame 7 or through the secondary thermal energy 93 which radiates from the thermosolar lid 3 or by cooperation of the primary thermal energy 91 and the secondary thermal energy 93. The thermal energies 91, 93 enable the entire interior 11 of the hive frame superstructure 1 to reach a temperature over 40° C., which results in death of bee parasites 20. Health of the bees and their brood is influenced by the exposition time of the thermal treatment, which is dependent on a distance of the hive bottom 2 and the thermosolar lid 3, on a hive surrounding temperature, sun radiation intensity and also on a thermo insulation characteristic of whole hive system.

In a case that the hive is perfectly sealed, the distance of furthest point of the brood nest 8 from the thermosolar lid 3 does not exceed 36 cm, surrounding temperature ranges in an interval 28-33° C., sky cloudiness is not over 20% of its surface, the hive bottom 2 is without gaps, the entrance 121 of the hive frame superstructure 1 stays open to a height of 1 cm and in the furthest point of brood nest 8 is to reach a temperature of at least 40° C., the period of a thermal exposition of the interior 11 of the hive frame superstructure 1 is set for two hours. However, the above-described most suitable conditions of thermal treatment of colonies do not have a universal validity and an effect is also influenced by other factors, for example used hive system or other natural conditions not mentioned here. The thermal exposition length in the interior 11 of the hive frame superstructure 1 is thus variable.

The described method of a thermal treatment of bee colonies and a device for pursuance of this method is not the only possible invention design, and the primary thermal energy 91 or the secondary thermal energy 93 can be obtained from thermal radiation from a source other than a solar source. For example, thermal radiation may be obtained through a thermo-energy component 40 with a source of generated radiation 60 in the form of hot air or electric resistance or bulb or hot liquid or flame or thermal accumulator, whereas the hive frame superstructure 1 does not have to have screen 5 as is illustrated in FIG. 4. Also the secondary thermal energy 93 can be obtained not only from the thermosolar lid 3 realized in the form of the ceiling, but can be sideways built-in into the hive frame superstructure 1 as it is clear from FIG. 5. In an alternative design, the thermosolar lid 3 can contain only the external frame part 33 realized by a perfectly transparent glass and the photo-absorbent component 36 modified for a transformation of short wave electromagnetic radiation for long wave thermal radiation. Likewise the device designed especially for a treatment of a bee colony in spring development regime can be in the hive frame superstructure 1 provided only with transparent screen 5, whereas in the interior 11 of the hive frame superstructure 1 is then placed a thermo solar frame 7 which is equipped with an active thermo insulation layer 72 situated in a direction toward the screen 5 as it is clear from FIG. 6. The device can also contain, under the brood nest 8, one or more hive frame superstructures 1.

The invention claimed is:

1. A method of thermal treatment of bee colonies in order to ensure death of bee parasites in an interior of a hive frame superstructure through transformation of short wave electromagnetic radiation into long wave thermal radiation, the method comprising:
    removing a thermally insulating removable hive cover from a thermosolar lid of the hive frame superstructure in the presence of solar rays to allow the solar rays to penetrate through the thermosolar lid of the hive frame superstructure and strike a surface adapted to absorb short wave electromagnetic radiation;
    allowing an interior of the hive frame superstructure to achieve a temperature increase above a value of 40° C.;
    replacing the thermally insulating removable hive cover on the thermosolar lid to block the passage of solar rays through the thermosolar lid and;
    allowing additional solar rays to pass through a screen on a side of the hive frame superstructure to strike a thermo solar frame, and wherein thermal energy flows in the interior of the hive frame superstructure upward along the thermo solar frame up to a level of the thermosolar lid and then proceeds in a horizontal direction further into the hive frame superstructure, where it heats a brood nest.

2. The method of thermal treatment of bee colonies according to claim 1, wherein the thermo solar frame comprises a thermo insulation layer that reflects metabolic heat which is radiated from the brood nest back into the interior of the hive frame superstructure.

3. The method of thermal treatment of bee colonies according to claim 1, wherein the surface adapted to absorb short wave electromagnetic radiation comprises a first surface of a photo-absorbent component that also comprises a radiant surface that radiates thermal energy into the interior of the hive frame superstructure where it heats the brood nest.

4. The method of thermal treatment of bee colonies according to claim 1, wherein energy which releases from the surface adapted to absorb short wave electromagnetic radiation in an upward direction is directed from at least one of an external frame part and from a thermo-insulating foil back in a direction toward the photo-absorbent component thereby forming a greenhouse effect in the thermosolar lid.

5. The method of thermal treatment of bee colonies according to claim 1, wherein thermal energy from the surface adapted to absorb short wave electromagnetic radiation and thermal energy from the thermo solar frame concurrently cause a temperature increase in an interior of the hive frame superstructure and heating of the brood nest.

6. The method of the thermal treatment of bee colonies according to claim 1, further comprising determining that the temperature inside the hive frame superstructure has exceeded 40° C.

7. A device for thermal treatment of bee colonies in order to cause death of bee parasites in an interior of a hive frame superstructure through a transformation of short wave electromagnetic radiation into long wave thermal radiation, comprising:

a hive frame superstructure generally enclosing an interior defining a brood nest area;

a thermosolar lid provided with a photo-absorbent component which contains an active surface adapted to absorb short wave electromagnetic radiation and a radiant surface;

a transparent screen on a side of the hive frame superstructure;

a thermo solar frame located in the interior of the hive frame superstructure and which is provided with an active photo-absorbent layer situated in a direction toward the transparent screen and a thermo insulating layer situated between the photo-absorbent layer and the brood nest area;

wherein the thermosolar lid forms a ceiling of the hive frame superstructure.

8. The device for thermal treatment of bee colonies according to claim 7, further comprising a thermally insulating removable hive cover adapted to cover the thermosolar lid and prevent passage of solar rays through the thermosolar lid.

9. The device for thermal treatment of bee colonies according to claim 7, wherein the screen is formed by a transparent external screen component and a transparent internal screen component whereas on the transparent internal screen component of the screen is fixed a drip for capture of condensed liquid.

10. The device for thermal treatment of bee colonies according to claim 9, wherein the thermo solar frame is in the interior of the hive frame superstructure such that between the thermo solar frame and the internal screen component of the screen is formed a front chamber for an upward flow of hot air and simultaneously there is a free space above a top frame end and a bottom frame end of the thermo solar frame.

11. The device for thermal treatment of bee colonies according to claim 7, wherein the thermosolar lid comprises a frame built into the hive frame superstructure.

12. The device for thermal treatment of bee colonies according to claim 7, wherein the thermosolar lid contains a transparent frame part adjacent to the photo-absorbent component whereas between the transparent frame part and the photo-absorbent component is formed a closed space.

13. The device for thermal treatment of bee colonies according to the claim 12, wherein a translucent thermo-insulating foil for an increase of a greenhouse effect is located in the closed space.

14. A device for thermal treatment of bee colonies to cause death of bee parasites in an interior of a hive frame superstructure by transforming short wave electromagnetic radiation into long wave thermal radiation comprising:

a hive frame superstructure generally enclosing an interior defining a brood nest area;

a thermosolar lid provided with a photo-absorbent component having a surface adapted to absorb short wave electromagnetic radiation and an opposite radiant surface;

a transparent screen on a side of the hive frame superstructure;

a thermo solar frame located in the interior of the hive frame superstructure and which is provided with an active photo-absorbent layer situated in a direction toward the transparent screen, the thermo solar frame and the transparent screen defining a front chamber adapted to permit upward flow of hot air between the thermo solar frame and the transparent screen;

wherein the thermosolar lid forms a ceiling of the hive frame superstructure.

15. The device for thermal treatment of bee colonies according to claim 14, further comprising an insulating layer between the photo-absorbent layer of the thermo solar frame and the brood nest area of the interior.

16. The device for thermal treatment of bee colonies according to claim 14, further comprising a thermally insulating removable hive cover adapted to cover the thermosolar lid and prevent passage of solar rays through the thermosolar lid.

* * * * *